(12) United States Patent
Wang

(10) Patent No.: US 6,711,292 B2
(45) Date of Patent: *Mar. 23, 2004

(54) BLOCK SELECTION OF TABLE FEATURES

(75) Inventor: Shin-Ywan Wang, Tustin, CA (US)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/222,850

(22) Filed: Dec. 30, 1998

(65) Prior Publication Data

US 2002/0106124 A1 Aug. 8, 2002

(51) Int. Cl.[7] .................................................. G06K 9/48
(52) U.S. Cl. ....................................... 382/199; 382/176
(58) Field of Search ................................ 382/174, 173, 382/176, 177, 180, 181, 202, 199; 707/509, 510; 715/509–510

(56) References Cited

U.S. PATENT DOCUMENTS

| | | | |
|---|---|---|---|
| 4,953,108 A | * 8/1990 | Kato et al. | 707/509 |
| 5,048,107 A | 9/1991 | Tachikawa | 382/48 |
| 5,075,895 A | 12/1991 | Bessho | 382/61 |
| 5,101,448 A | 3/1992 | Kawachiya et al. | 382/61 |
| 5,129,012 A | 7/1992 | Abe | 382/16 |
| 5,185,813 A | 2/1993 | Tsujimoto | 382/9 |
| 5,278,920 A | 1/1994 | Bernzott et al. | 382/9 |
| 5,287,417 A | * 2/1994 | Eller et al. | 382/276 |
| 5,335,290 A | 8/1994 | Cullen et al. | 382/9 |
| 5,341,227 A | 8/1994 | Kumashiro | 358/533 |
| 5,420,695 A | 5/1995 | Ohta | 358/462 |
| 5,448,692 A | 9/1995 | Ohta | 395/147 |
| 5,465,304 A | 11/1995 | Cullen et al. | 382/176 |
| 5,485,566 A | 1/1996 | Rahgozar | 395/148 |
| 5,587,808 A | 12/1996 | Hagihara et al. | 358/462 |
| 5,588,072 A | * 12/1996 | Wang | 382/176 |
| 5,617,485 A | 4/1997 | Ohuchi et al. | 382/176 |
| 5,661,818 A | 8/1997 | Gaborski et al. | 382/132 |
| 5,680,478 A | 10/1997 | Wang et al. | 382/176 |
| 5,680,479 A | 10/1997 | Wang et al. | 382/176 |
| 5,689,342 A | 11/1997 | Nakatsuka | 358/296 |
| 5,729,627 A | 3/1998 | Mizuno et al. | 382/173 |
| 5,745,596 A | 4/1998 | Jefferson | 382/176 |
| 5,754,708 A | 5/1998 | Hayashi et al. | 382/266 |
| 5,771,313 A | 6/1998 | Hayashi et al. | 382/176 |
| 5,774,579 A | 6/1998 | Wang et al. | 382/176 |
| 5,822,454 A | 10/1998 | Rangarajan | 382/180 |
| 6,006,240 A | * 12/1999 | Handley | 707/510 |
| 6,044,383 A | * 3/2000 | Suzuki et al. | 707/509 |
| 6,081,616 A | * 6/2000 | Vaezi et al. | 382/171 |

OTHER PUBLICATIONS

Katsuhiko Itonori; "Table Structure Recognition based on Textblock Arrangement and Ruled Line Position"; IEEE; Proceedings of the Second International Conference; pp. 765–768, Jul. 1993.*

Yuki Hirayama; "A Method for Table Structure Analysis Using DP Matching"; IEEE; Proceedings of the Third International Conference; vol. 2; pp. 583–586, Sep. 1995.*

* cited by examiner

Primary Examiner—Timothy M. Johnson
(74) Attorney, Agent, or Firm—Fitzpatrick, Cella, Harper & Scinto

(57) ABSTRACT

A method for identifying a table image in a document image includes identifying a frame image in the document image, identifying white areas within the frame image, identifying broken lines within the frame image, calculating horizontal and vertical grid lines based on the identified white areas and the identified broken lines, and determining whether the frame is a table image based on the calculated horizontal and vertical grid lines.

42 Claims, 14 Drawing Sheets

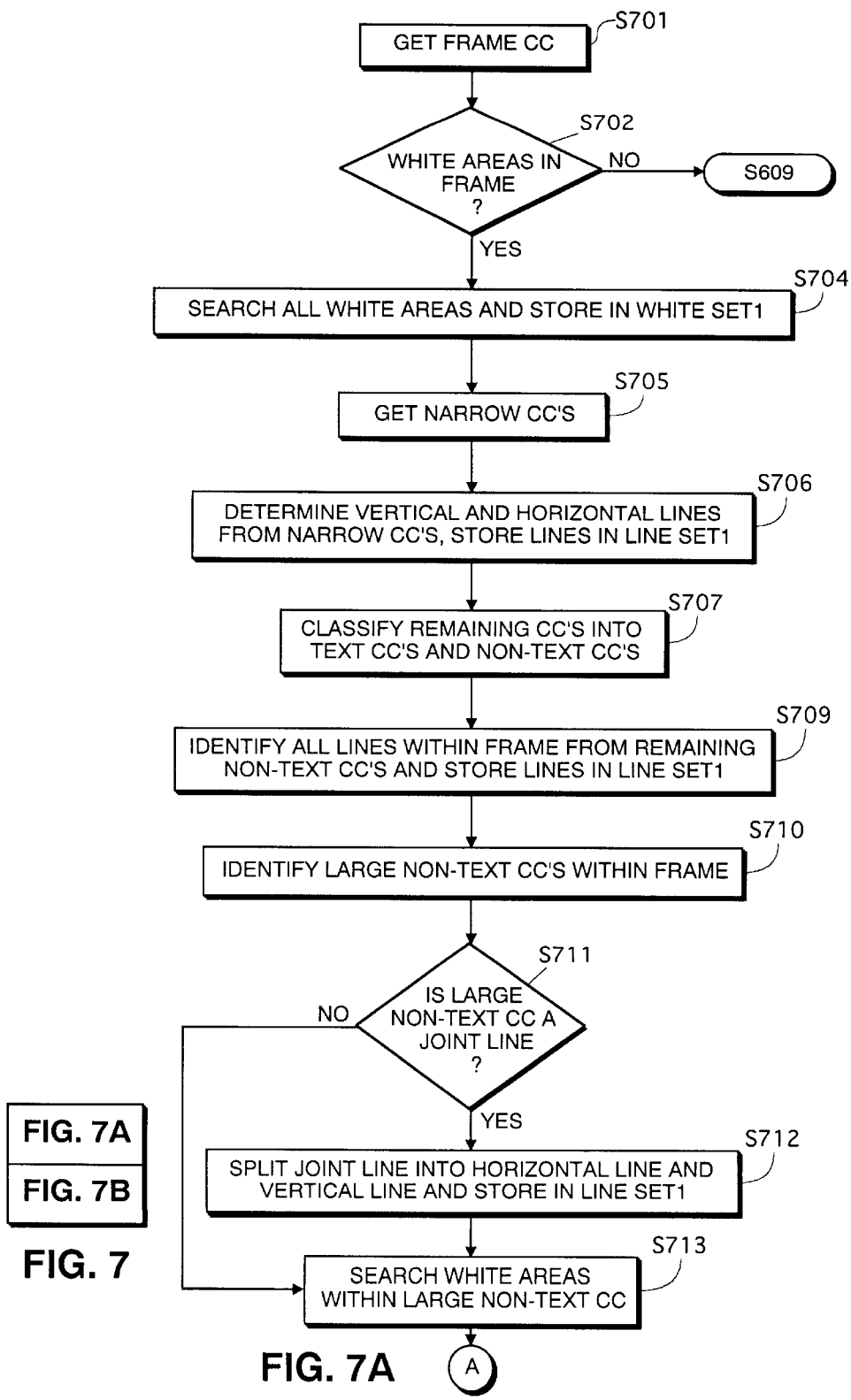

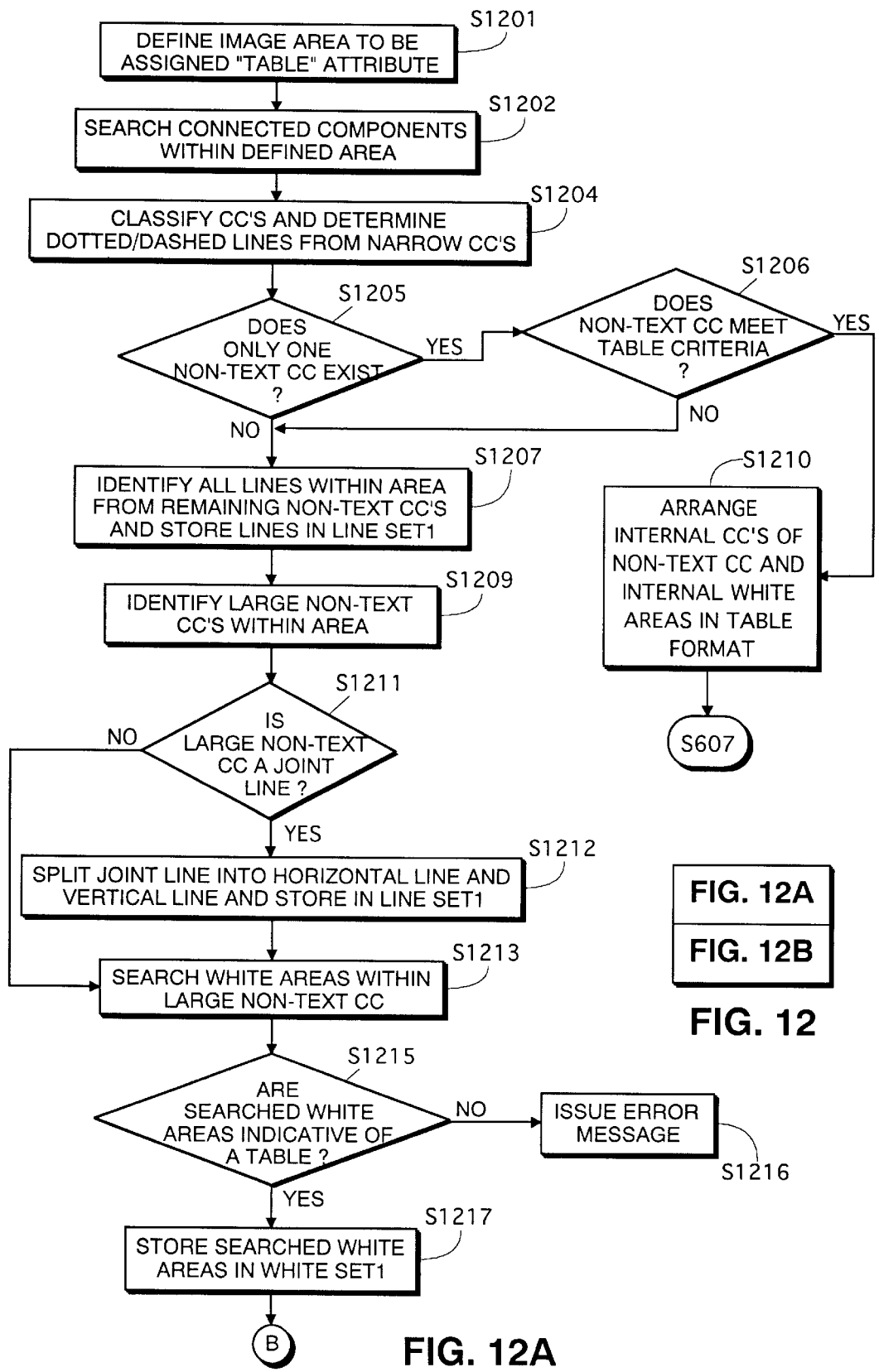

BLOCK SELECTION OF TABLE FEATURES

BACKGROUND OF THE INVENTION

1. Field of the Invention

The present invention relates to page segmentation systems for classifying data within specific regions of a document image. In particular, the present invention relates to a block selection system for identifying table images in a document image and for identifying features within the table images.

2. Incorporation by Reference

Commonly-assigned U.S. patent applications Ser. No. 07/873,012, now U.S. Pat. No. 5,680,479, entitled "Method and Apparatus For Character Recognition", Ser. No. 08/171,720, now U.S. Pat. No. 5,588,072, entitled "Method and Apparatus For Selecting Text And/Or Non-Text Blocks In A Stored Document", Ser. No. 08/338,781, entitled "Page Analysis System", Ser. No. 08/514,250, now U.S. Pat. No. 5,774,579, entitled "Block Selection System In Which Overlapping Blocks Are Decomposed", Ser. No. 08/514,252, now U.S. Pat. No. 5,848,186, entitled "Feature Extraction System", Ser. No. 08/664,675, entitled "System For Extracting Attached Text", and Ser. No. 09/002,684, entitled "System For Analyzing Table Images," are herein incorporated as if set forth in full.

3. Description of the Related Art

A conventional page segmentation system can be applied to a document image in order to identify data types contained within specific regions of the document image. The identified types can then be used to extract data of a particular type from a specific region of the document image and to determine a processing method to be applied to the extracted data.

For example, using conventional systems, data identified as text data is extracted from a specific region of a document and subjected to optical character recognition (OCR) processing. Results of the OCR processing are stored in ASCII code along with information regarding the location of the specific region. Such storage facilitates word processing of the text data as well as subsequent reconstruction of the document. In addition, conventional systems can be used to extract data identified as graphics data, subject the extracted data to image compression, and store the compressed data along with location information. In sum, conventional page segmentation systems allow automatic conversion of bit-mapped image data of a document to an appropriate format, such as ASCII, JPEG, or the like, and also allow substantial reconstruction of the bit-mapped image.

One specialized example of such page segmentation concerns table images within a document. Once a table image is identified, processing such as that described in above-mentioned U.S. Pat. No. 5,848,186 or U.S. patent application Ser. No. 09/002,684 can be used to identify rows and columns within the table, to extract text data within individual table cells defined by the rows and columns, and to subject the extracted text data to OCR processing. As a result, table image data located within a document image can be automatically input to a spreadsheet application in proper row/column format.

The above-described systems are designed to recognize a standard-format table image having a solid frame and solid horizontal and vertical lines defining rows and columns within the table image. Accordingly, in a case that a table image contains broken or dotted grid lines, or contains no grid lines at all, the above systems are not likely identify the image as a table. Rather, the table is likely determined to be a region of text or a line drawing. Consequently, row/column information is not determined, nor are individual cells within the table associated with row/column addresses.

SUMMARY OF THE INVENTION

The present invention addresses the foregoing by providing identification of a table image in a document in which grid lines of the table image are broken, dotted, or otherwise incomplete. An additional aspect of the present invention provides output of text block coordinates and coordinates of areas roughly corresponding to individual table cells within the identified table. Advantageously, such information can be input to a table feature identification system to identify table columns, rows, or other features.

In one specific aspect, the invention is a system for identifying a table image in a document image which includes identification of a frame image in the document image, identification of white areas within the frame image, identification of broken lines within the frame image, calculation of horizontal and vertical grid lines based on the identified white areas and the identified broken lines, and determination of whether the frame is a table image based on the calculated horizontal and vertical grid lines. Beneficially, the identified table image can then be subjected to table-specific processing.

As described above, conventional page segmentation systems often misidentify a table image which does not contain a full set of horizontal and vertical grid lines. The present invention can also be utilized in such cases to properly identify and process the table image. According to this aspect, the present invention relates to a system for processing a region as a table image in a block selection system for identifying regions of a document image. The invention includes acceptance of user input indicating that a region of a document image is a table image, identification of white areas within the region, identification of broken lines within the region, and calculation of horizontal and vertical grid lines based on the identified white areas and the identified broken lines. As a result of the foregoing features, table information is obtained corresponding to the region, and can be used to further analyze the region for table features such as rows, columns or the like.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

FIG. 7, comprising FIG. 7A and FIG. 7B, is a flow diagram of process steps to perform table analysis according to the present invention.

FIG. 12, comprising FIG. 12A and FIG. 12B, is a flow diagram of process steps to perform table analysis according to the present invention.

DETAILED DESCRIPTION OF THE PREFERRED EMBODIMENTS

Figure 1:
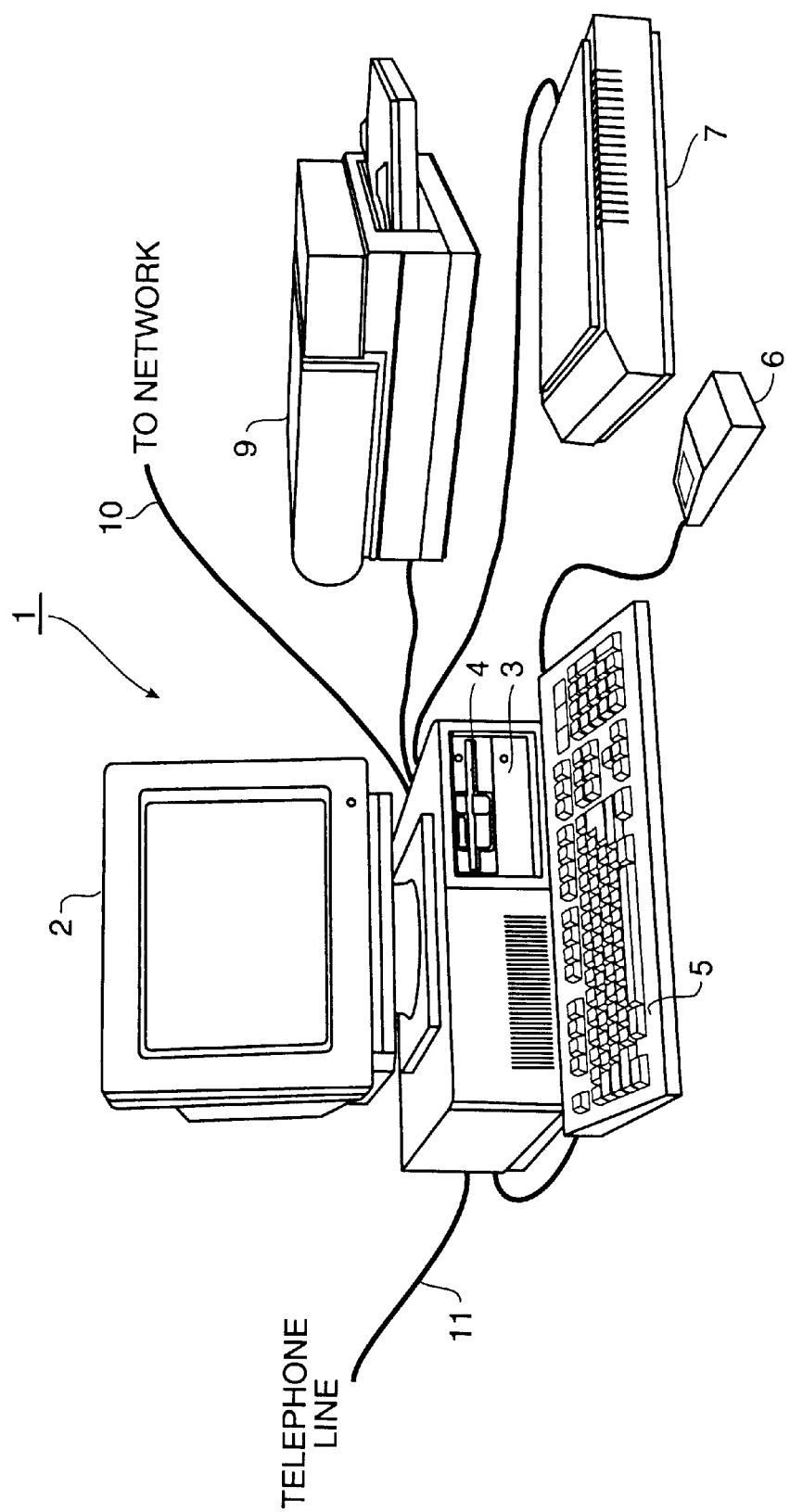
FIG. 1 is an outward view showing representative computing equipment according to the present invention.

FIG. 1 is a view showing the outward appearance of representative computing equipment embodying a system for analyzing table image features according to the present invention.

Shown in FIG. 1 is computing equipment 1, such as an IBM PC or PC-compatible computer having a windowing environment such as the Microsoft Windows98® operating system. Computing equipment 1 is provided with color display monitor 2, using which computing equipment 1 displays images to a user. Computing equipment 1 is also provided with fixed disk drive 3 for storing data files and application program files, keyboard 5 for inputting text data and for manipulating objects displayed on display monitor 2, and pointing device 6, such as a mouse, which is provided for pointing to and for manipulating objects displayed on display monitor 2.

Computing equipment 1 also includes floppy disk drive 4 for reading from and writing to a floppy diskette. In this regard, document image files, as well as computer-executable process steps embodying the present invention, may be stored either on fixed disk 3 or on a floppy disk inserted in floppy disk drive 4. Alternatively, document image files and/or computer-executable process steps may be stored on a CD-ROM and accessed via a CD-ROM drive (neither shown).

Document image files and computer-executable process steps embodying the present invention may also be accessed over a local area network via network connection 10 or from another source such as the World Wide Web via standard telephone line 11.

Typically, applications stored on fixed disk 3, including a block selection application embodying the present invention, are downloaded from a computer-readable medium, such as a floppy disk, a CD-ROM, a network drive, or the World Wide Web, and thereafter stored on disk 3. Document images may also be obtained from any of these sources, or from scanner 7, which scans a document to provide binary bit-mapped image data representing the document to computing equipment 1.

Printer 9 is provided for outputting document images processed by computing equipment 1.

In operation, and under control of the windowing operating system, stored application programs, such as a block selection application embodying the present invention, are selectively activated to process and to manipulate stored data. In accordance with operator instructions, and based on the stored application programs, commands are issued to input a document image via scanner 7, to display images on monitor 2, and to print the displayed images using printer 9.

Figure 2:
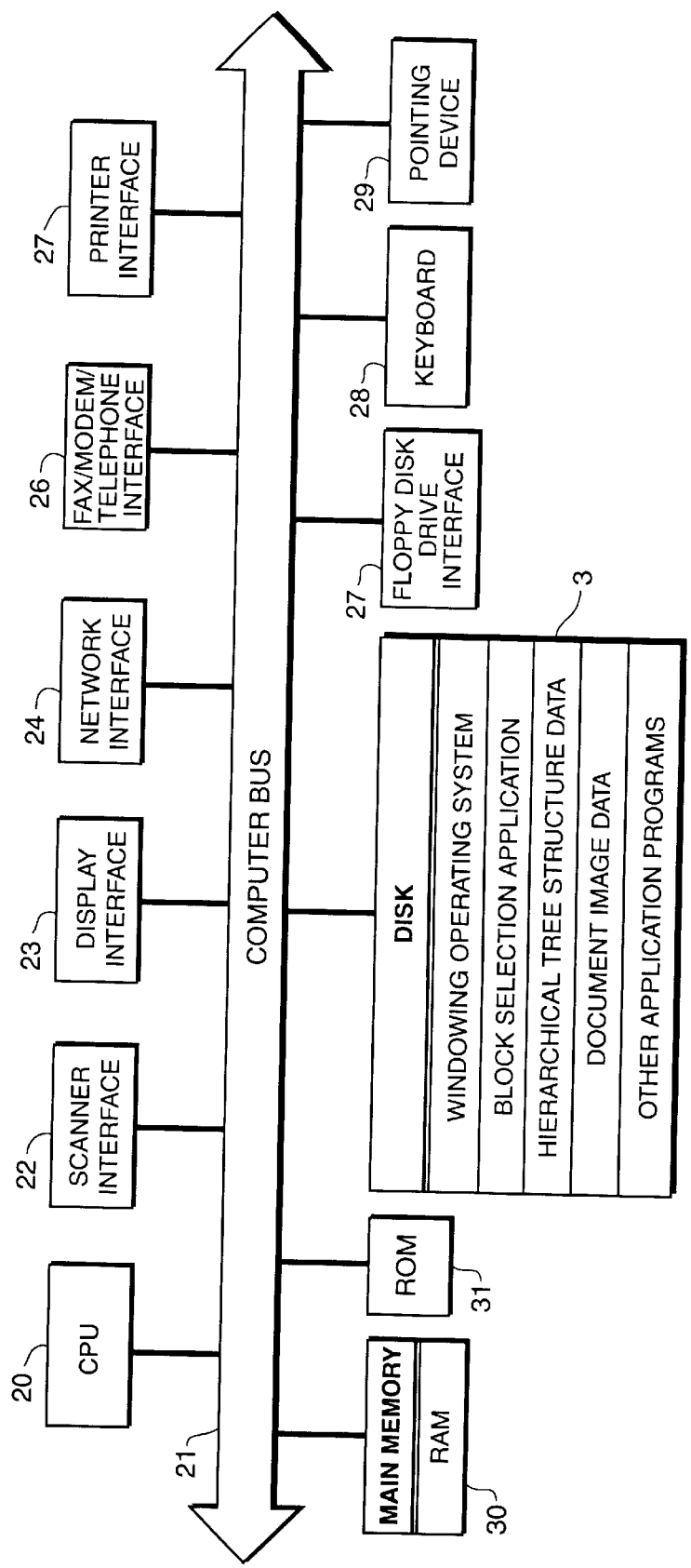
FIG. 2 is a view of an internal architecture of the FIG. 1 computing equipment.

FIG. 2 is a detailed block diagram showing the internal architecture of computing equipment 1. As shown in FIG. 2, computing equipment 1 includes a central processing unit (CPU) 20, such as an Intel Pentium® microprocessor, interfaced to computer bus 21. Also interfaced to computer bus 21 are scanner interface 22, display interface 23, network interface 24 for interfacing to network connection 10, fax/modem/telephone interface 25 for interfacing to telephone line 11, printer interface 26, floppy disk drive interface 27, keyboard interface 28, and mouse interface 29.

As shown, disk 3 stores, among other files necessary for operation of computing equipment 1, files comprising a windowing operating system, computer-executable process steps embodying a block selection application according to the present invention, hierarchical tree structure data representing document images, document image data, and other application programs. Hierarchical tree structure data will be discussed below.

Main memory 30, such as random access memory (RAM), interfaces to computer bus 21 so as to provide CPU 20 with access to memory storage. In particular, when executing computer-executable process steps such as those stored on disk 3, CPU 20 loads those steps from disk 3 or another storage media into main memory 30 and executes those process steps out of main memory 30. Main memory 30 also provides buffer storage for storing data used during execution of process steps according to the present invention.

Read only memory (ROM) 31 is used for storing computer-executable process steps, such as those used during boot-up, or basic input/output operating system (BIOS) sequences for operation of, for example, keyboard 5.

Figure 3:
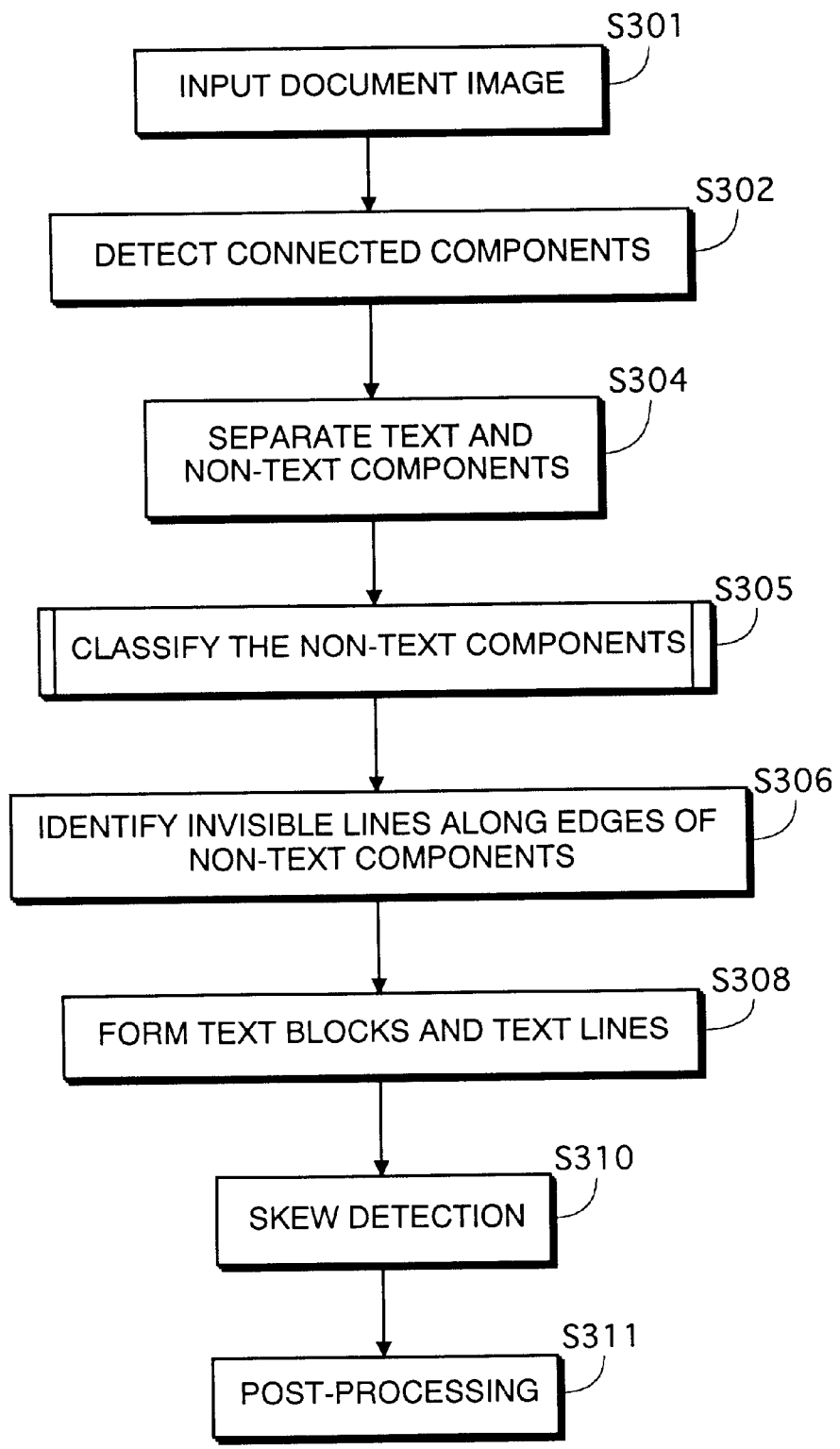
FIG. 3 is a flow diagram of process steps to perform block selection processing.

According to a preferred embodiment, the present invention is utilized by a block selection application such as those described in aforementioned U.S. Pat. Nos. 5,680,479, 5,588,072 and 5,848,186. In this regard, FIG. 3 is a general flow diagram of process steps to perform such block selection. Preferably, the FIG. 3 process steps are stored on fixed disk 3, copied to main memory 30, and executed therefrom by CPU 20.

The process steps of FIG. 3 are used to input a document image, to detect connected components within the document image, to separate text and non-text connected components, to classify non-text connected components, to identify invisible lines along edges of non-text components, to form text blocks and text lines, to detect skew of the input image, and to post-process the image. Various versions of the FIG. 3 process steps are set forth in detail within U.S. Pat. Nos. 5,680,479, 5,588,072 and 5,848,186. Accordingly, in the interest of brevity and clarity, the following is a general description of the FIG. 3 process steps.

Flow begins at step S301 of FIG. 3, in which bit-mapped pixel data of a document image is input into computing equipment 1 via scanner 7, a floppy disk inserted in floppy disk drive 4, network connection 10, telephone line 11, or other means and is stored in disk 3 or in main memory 30. In step S302, the input image data is analyzed so as to detect connected components within the document image. A connected component is a group of black pixels that is completely surrounded by white pixels. The detected connected components are then rectangularized, or "blocked", by defining, for each connected component, a smallest rectangle circumscribing the connected component.

The connected components are roughly classified into text connected components and non-text connected components in step S304. Generally, the classification is based on dimensions of the defined rectangle circumscribing each connected component and on an assumption that non-text connected components are larger than text connected components.

Next, in steps S305, connected components classified as non-text in step S304 are further analyzed to determine subclassifications. Such subclassifications include line, joint-line, picture, line art, frame, table, or unknown (none of the above). Again, this subclassification is based on criteria thresholds formulated mathematically and calculated dynamically based on size, width, and relative positions of connected components being analyzed. Step S305 will be discussed in greater detail with respect to FIG. 4.

After subclassification, invisible lines, or regions of white pixels, are identified along edges of non-text connected components in step S306. For example, a vertical invisible line may be located between two "picture" connected components. The invisible line can be used in step S308, described below, to determine whether text connected components located below the picture components should be grouped together or within separate columnar blocks.

In this regard, flow proceeds from step S306 to step S308, in which text blocks are formed from the text connected components classified in step S304. More specifically, close horizontal and vertical neighbors of each text connected component are aggregated into text blocks based on a statistical analysis of horizontal and vertical gaps between neighboring text components. Any formed text blocks are further analyzed so as to form text lines. U.S. Pat. No. 5,588,072 contains a detailed description of a preferred embodiment of step S308.

Next, in step S310, a skew of the input document image is detected and, if the skew angle exceeds a predefined maximum, an error code is output. The error code signals to the user that the input document page is too skewed to complete block selection processing.

If the skew is within acceptable limits, flow advances to step S311 in which post-processing is performed. Post-processing is intended to result in a more compact and "clean" block representation of the document image, and can be tailored to suit particular types of subsequent processing, such as character recognition, data compression, and the like. Generally, however, post-processing involves associating text blocks with other text or non-text blocks.

Execution of the FIG. 3 process steps produces location information of data within a document image, as well as data type information of data within the document image. As a result, the FIG. 3 process steps can be used in conjunction with an optical character recognition system so as to recognize characters represented by image data, to convert the characters into an ASCII format, and to store the data in an ASCII file. In addition, the process steps enable image data within the document to be extracted, subjected to data compression, and stored.

Figure 4:
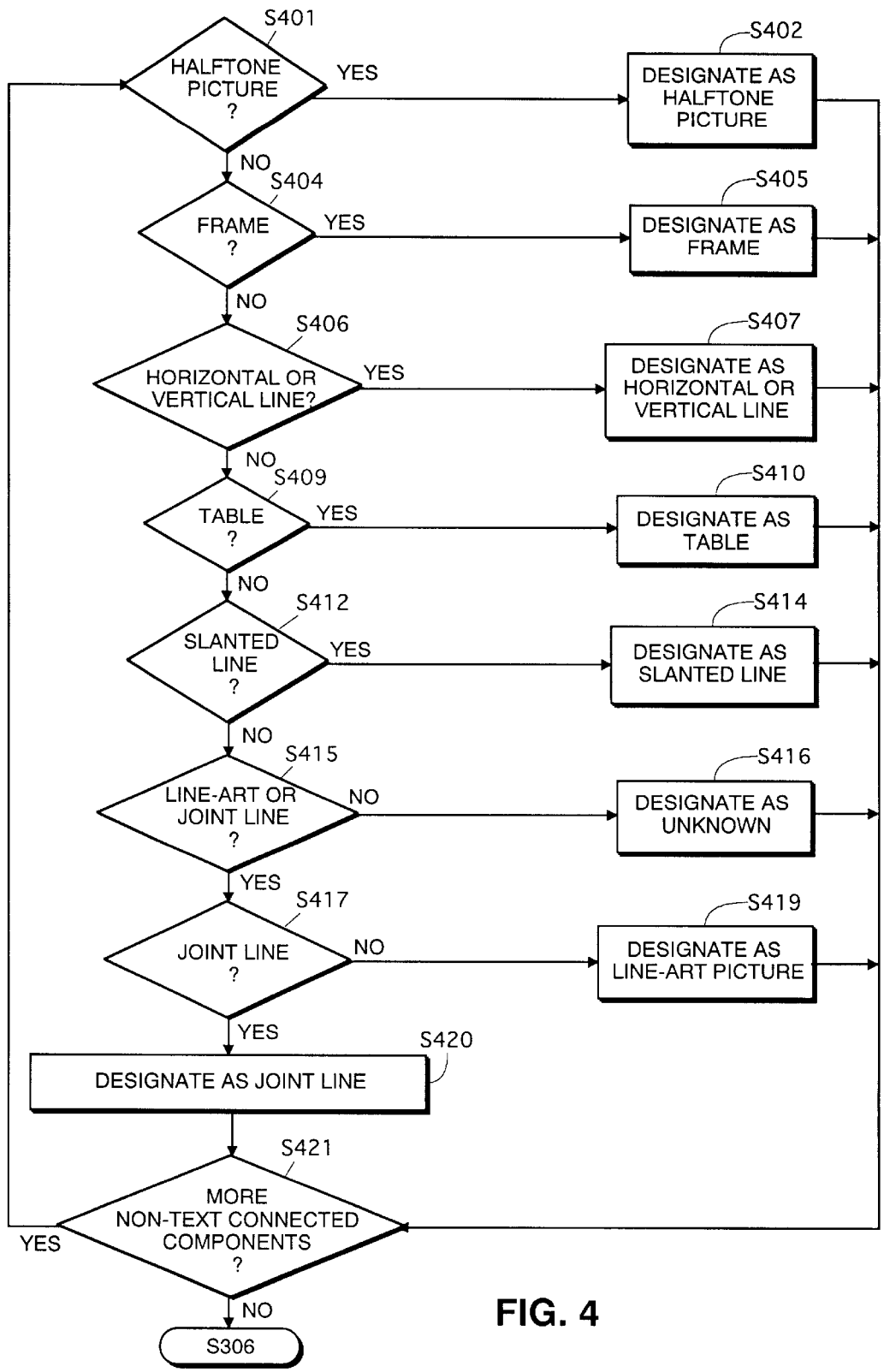
FIG. 4 is a flow diagram of process steps to classify connected components.

FIG. 4 is a flow diagram describing a method for classifying non-text connected components according to step S305. Because individual steps of FIG. 4 are described in greater detail in U.S. Pat. Nos. 5,588,072 and 5,680,479, only a general description will be provided below.

Generally, the non-text connected component classification described in FIG. 4 is based on criteria thresholds which are formulated mathematically and calculated dynamically based on the size, width and the like of the connected components being analyzed. Thus, in step S401, a non-text connected component is analyzed to determine whether it is a halftone (or continuous-tone) picture. If so, flow advances to step S402, at which point a "halftone (continuous-tone) picture" sub-attribute is assigned to the non-text connected component.

If the non-text connected component is not determined to be a halftone picture in step S401, then flow advances to step S404 in which it is determined whether the non-text connected component is a frame. If so, flow advances to step S405 at which time a "frame" sub-attribute is assigned to the connected component. If the determination in step S404 is negative, flow proceeds to step S406, wherein it is determined whether the non-text connected component is a horizontal or vertical line. Flow proceeds to step S407 in a case that the connected component is determined to be a horizontal or vertical line. In step S407, a "horizontal line" or "vertical line" sub-attribute is assigned to the non-text connected component.

Step S409 is executed in a case that, in step S406, the non-text connected component is not determined to be a vertical line or a horizontal line. In step S409, it is determined whether the non-text connected component is a table. Briefly, in order to determine whether the non-text connected component is a table, internal white areas of the connected component are traced in four directions. Internal white areas are areas of white pixels completely surrounded by black pixels. If at least four internal white areas are found, and if the arrangement of the white areas is in a table-like grid such that the white areas are enclosed by horizontal and vertical lines, then the non-text connected component is designated as a table in step S410. More detailed descriptions for determining whether a connected component is a table are found in U.S. Pat. Nos. 5,588,072, 5,680,479, and 5,848,186.

Also in step S410, the interior of the identified table is re-analyzed in accordance with steps S302 and S304 so as to identify and classify text and non-text connected components internal to the table.

If it was not determined in step S409 that the non-text connected component is a table, flow advances to step S412 in which it is determined whether the non-text connected component is a slanted line. If so, a "slant line" sub-attribute is assigned to the non-text connected component in step S414.

If the determination in step S412 is negative, flow proceeds to step S415, where it is determined if the non-text connected component is a line-art picture or a joint line. If the non-text connected component is not a line-art picture or a joint line, flow proceeds to step S416, wherein an "unknown" attribute is assigned to the connected component. If so, flow proceeds to step S417, wherein it is determined whether the non-text connected component is a joint line.

If the non-text connected component is not a joint line, then the non-text connected component is, in step S419, designated as a line art picture. If the non-text connected component is determined to be a joint-line picture in step S417, flow proceeds to step S420, where a "joint line" sub-attribute is assigned to the component. Flow then proceeds to step S421.

It should be noted that each of steps S402, S405, S407, S410, S414, S416, and S419 also flow to step S421, wherein it is determined whether additional non-text connected components remain to be classified. If so, flow returns to step S401. If not, flow proceeds to step S306 of FIG. 3.

Figure 5:
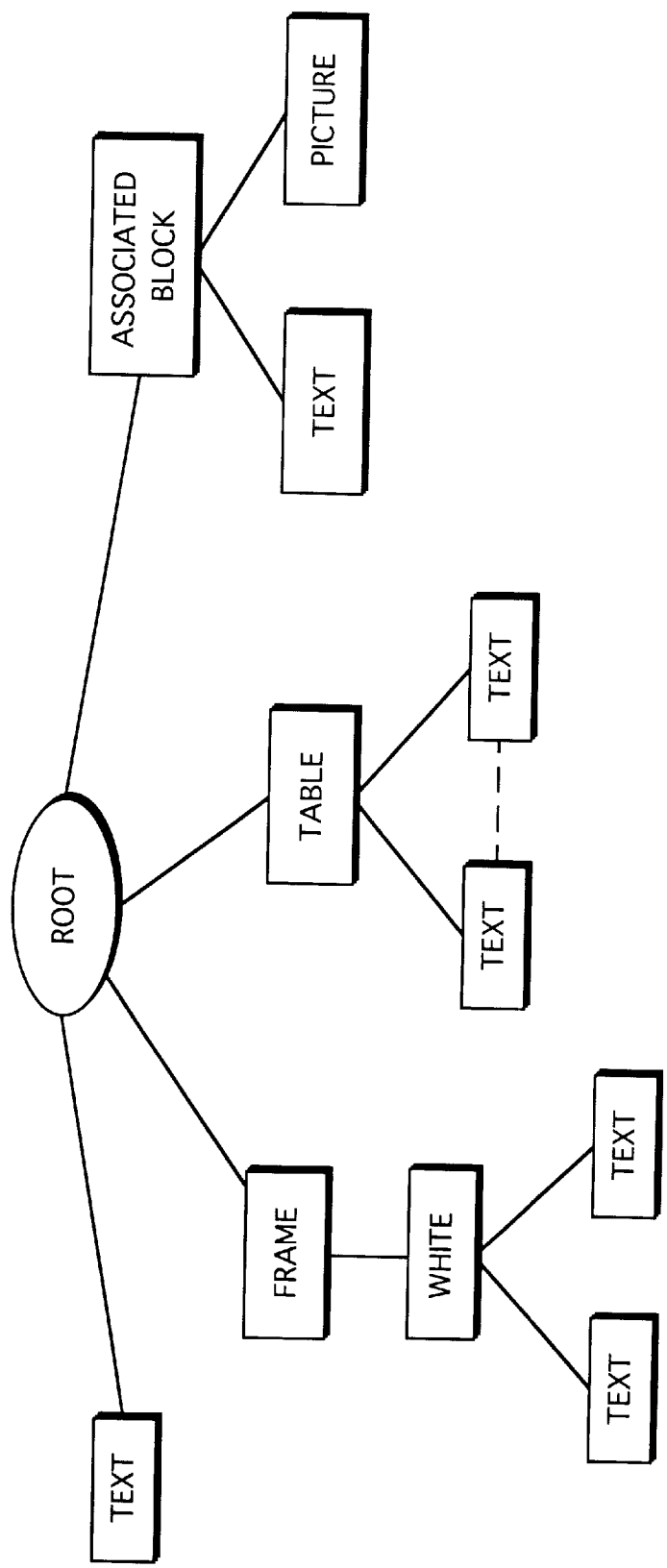
FIG. 5 is a representative view of a hierarchical tree structure of a document image.

Preferably, and as described in each of the U.S. applications and patents incorporated herein by reference, the information produced by a block selection application is stored in a hierarchical tree structure such as that shown in FIG. 5. FIG. 5 shows that a document page is represented by a root node. Descending from the root node are other nodes representing blocks of image data identified within the document. Each node stores as least coordinates of a rectangularized block represented by the node, as well as the type of data within the block. As also shown in FIG. 5, image data located within another block of other image data is represented as a "child" node descending from a "parent" node representing the another block. Parent nodes may also be used to indicate an association between blocks of data, for example, between a block of picture data and a block of text data.

A hierarchical tree structure such as that shown in FIG. 5 is stored so as to assist in reconstructing the document page from the location information and data type information stored in the hierarchical tree structure. Additionally, ASCII files representing identified text within the document image can be used to recreate text portions of the document at appropriate locations specified by the location information. Similarly, compressed picture data from the original document can be decompressed and included in a reconstructed document at an appropriate location.

Figure 6:
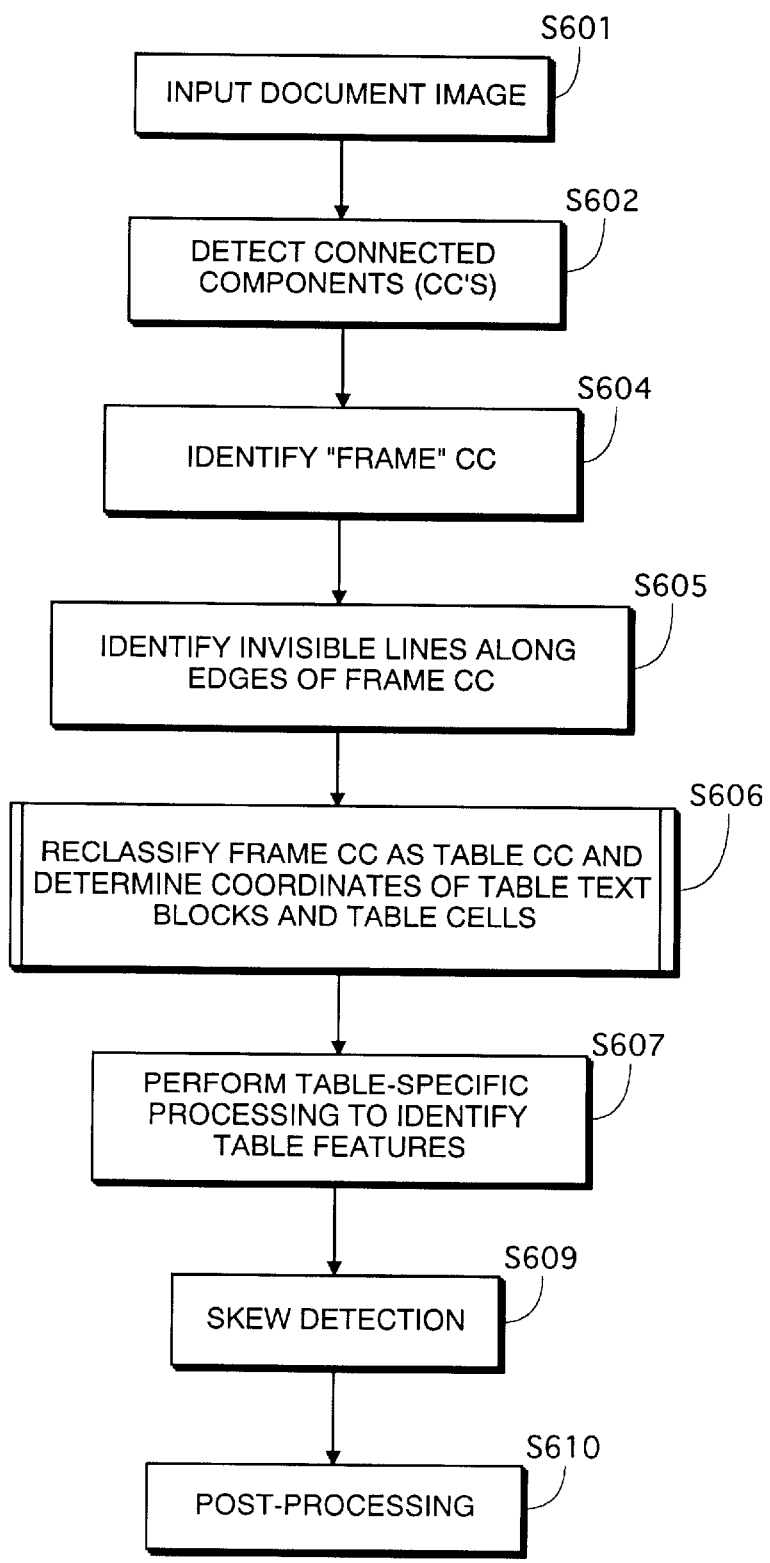
FIG. 6 is a flow diagram of process steps to perform table-specific block selection processing according to the present invention.

FIG. 6 is a flow diagram of computer-executable process steps according to the present invention. The FIG. 6 process steps correspond roughly to those illustrated in FIG. 3, however, the FIG. 6 steps are more particularly directed to analyzing table images according to the present invention. The process steps are preferably stored on fixed disk 3 and executed by CPU 20.

In this regard, flow begins at step S601, at which bitmapped binary pixel data of a document image is input. Next, in step S602, connected components within the input data are detected. A connected component is identified as a "frame" in step S604. As described above with respect to step S306, invisible lines (white pixels) are then identified surrounding the detected frame connected component.

In step S606, steps according to the present invention are executed to reclassify the frame as a "table" connected component, if warranted, and, if so, to determine coordinates of table text blocks and table cells. Step S606 will be described in greater detail below. Next, table features are identified in step S607. Such table features may include visible or non-visible grid line locations, row/column address data, cell data, or the like. U.S. Pat. No. 5,848,186 and U.S. patent application Ser. No. 09/002,684 each describe systems suitable to perform the table-specific processing of step S607.

Skew detection and post-processing are performed in steps S609 and S610, respectively, and proceed similarly as described with respect to steps S310 and S311.

Figure 7B:
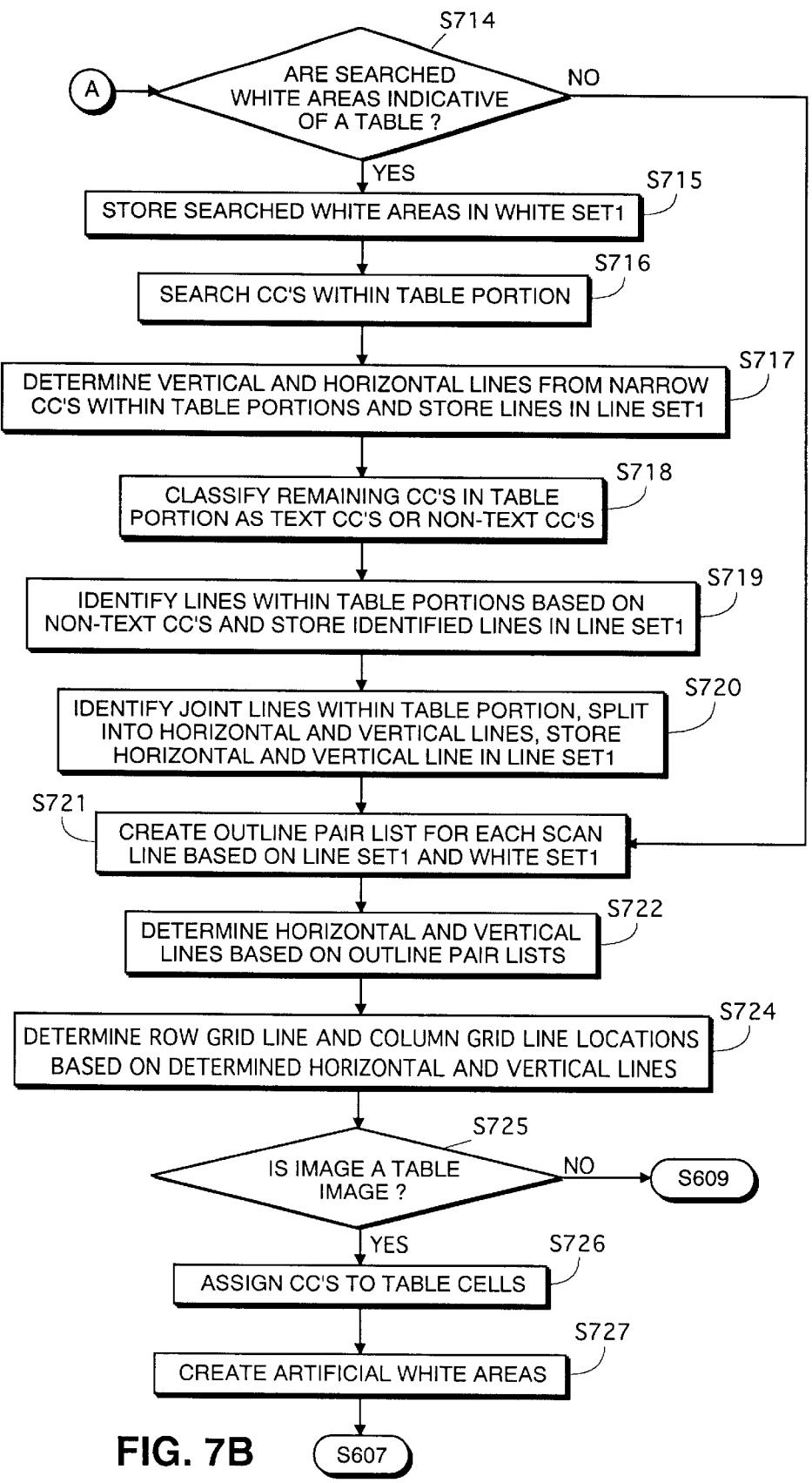

FIG. 7 is a flow diagram of computer-executable process steps corresponding to step S606. The FIG. 7 steps are also preferably stored on fixed disk 3 and executed by CPU 20.

Briefly, the FIG. 7 process steps include steps to identify a frame image in the document image, to identify white areas within the frame image, to identify broken lines within the frame image, to calculate horizontal and vertical grid lines based on the identified white areas and the identified broken lines, and to determine whether the frame is a table image based on the calculated horizontal and vertical grid lines.

Figure 8:
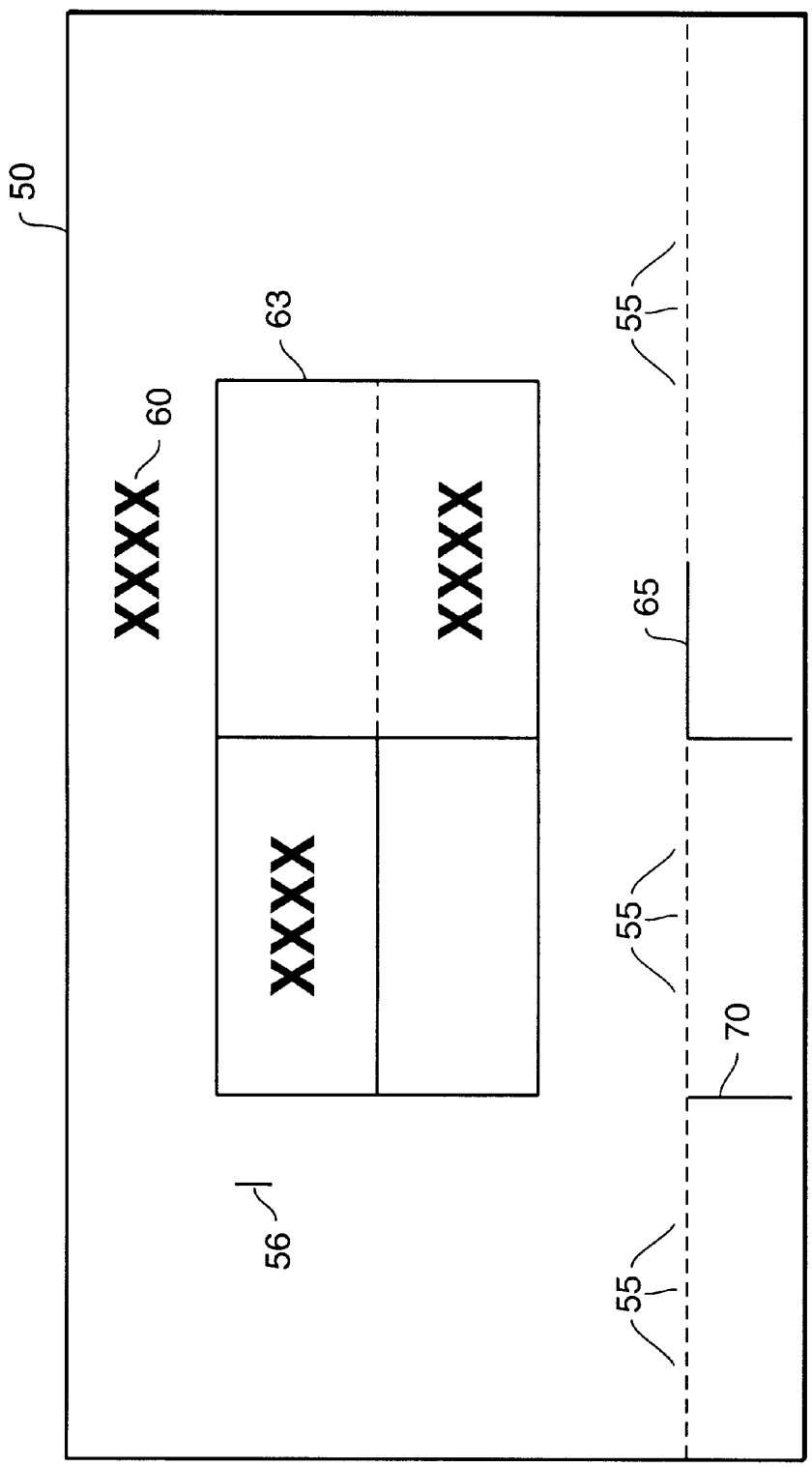
FIG. 8 is a view of a representative table image of a document image.

In particular, a connected component identified as a frame is retrieved in step S701. FIG. 8 shows such a connected component. As shown, connected component 50 is rectangularly-shaped but does not contain a substantial set of solid horizontal and vertical grid lines. As such, the techniques discussed above with respect to step S409 are not likely to identify component 50 as a table. Rather, by virtue of steps S404 and S405, component 50 is most likely designated a frame.

Figure 9:
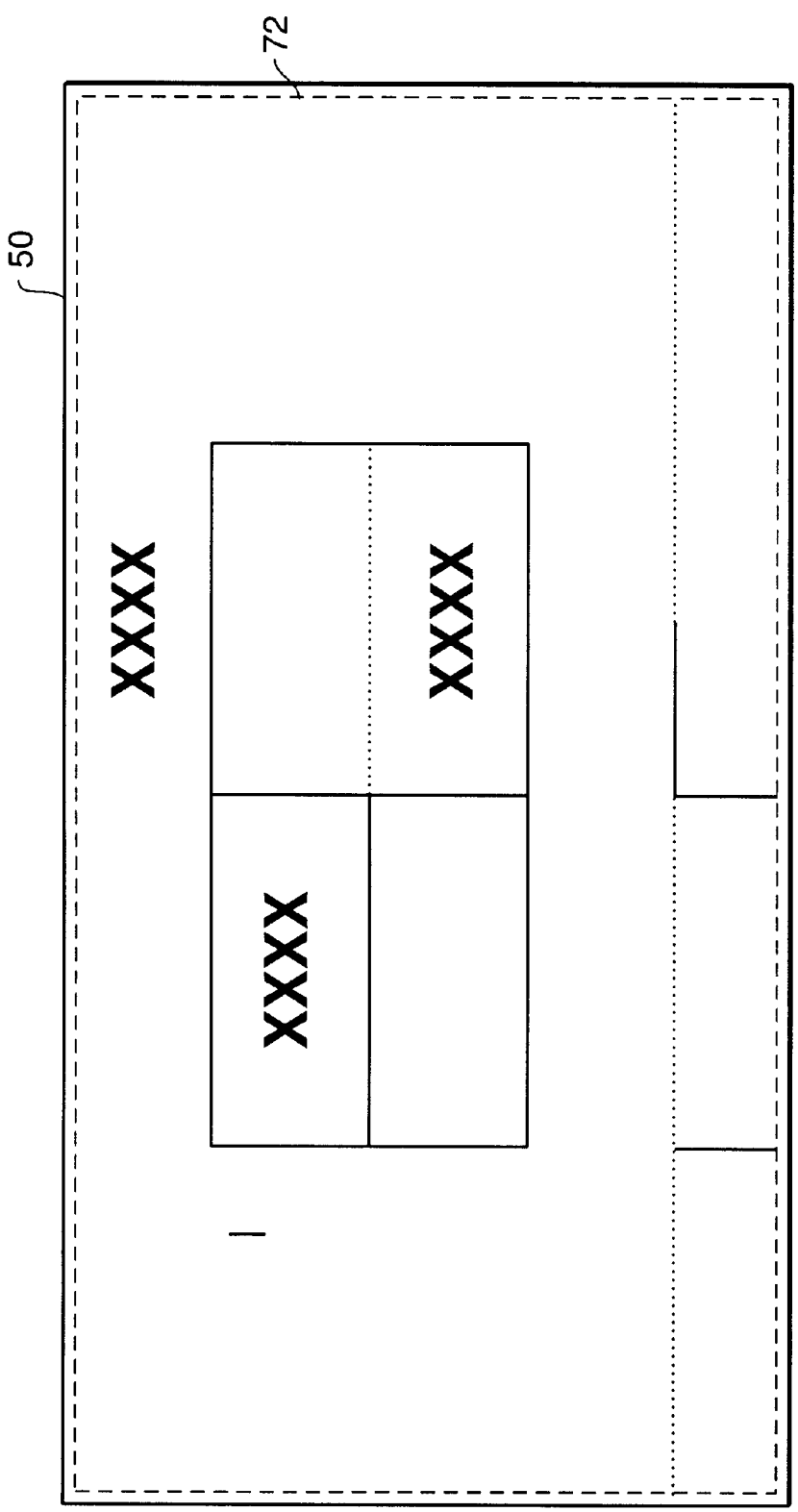
FIG. 9 is a view of a the FIG. 8 table image showing traced white areas.

Next, in step S702, it is determined whether any white areas are present within frame 50. White areas are regions of white pixels completely surrounded by black pixels. If no white areas are present, flow proceeds to step S609 and the retrieved component remains designated a frame. If so, flow continues to step S704, in which pixel locations of boundaries of the white areas are identified and stored in a buffer hereinafter referred to as WHITE_SET1. The WHITE_SET1 buffer is preferably located in main memory 30. FIG. 9 shows white area 72 traced within component 50. Due to this area, analysis of component 50 proceeds from step S702 to step S704. At step S704, the boundaries of the identified white areas are stored in WHITE_SET1.

In step S705, connected components within component 50 are traced using the contour tracing method and sizes of the connected components are judged to locate narrow, short components which may form a dotted or dashed line. The retrieved connected components are analyzed to determine whether they form any horizontal or vertical lines. If so, coordinates of the connected components forming identified lines are stored in a buffer referred to as LINE_SET1. LINE_SET1 is also preferably located in main memory 30.

For example, returning to FIG. 8, components 55 and 56 of component 50 represent narrow connected components located and retrieved in step S705. In step S706, it is determined that components 55 form a horizontal line and locations of components 55 are stored in LINE_SET1.

In step S707, the remaining components within component 50 are classified into text and non-text components. As such, component 60 is classified as text and component 63, 65 and 70 are classified as non-text. It should be noted that the components within component 63 are not detected as connected components using the above-described contour tracing method.

Next, in step S709, the identified non-text connected components are analyzed to detect horizontal and vertical lines and to store locations an of the lines in LINE_SET1. With respect to component 50, line 70 is identified and stored in LINE_SET1.

Large components are identified within frame 50 in step S710. In the case of component 50, components 63 and 65 are identified in step S710. If, in step S711, the large component is determined to be a jointed line, such as component 65, flow proceeds to step S712, in which the joint line is split into a horizontal and vertical line and the two lines are stored in LINE_SET1. Flow then continues to step S713. If no large component is determined to be a joint line, flow proceeds directly to step S713.

Figure 10:
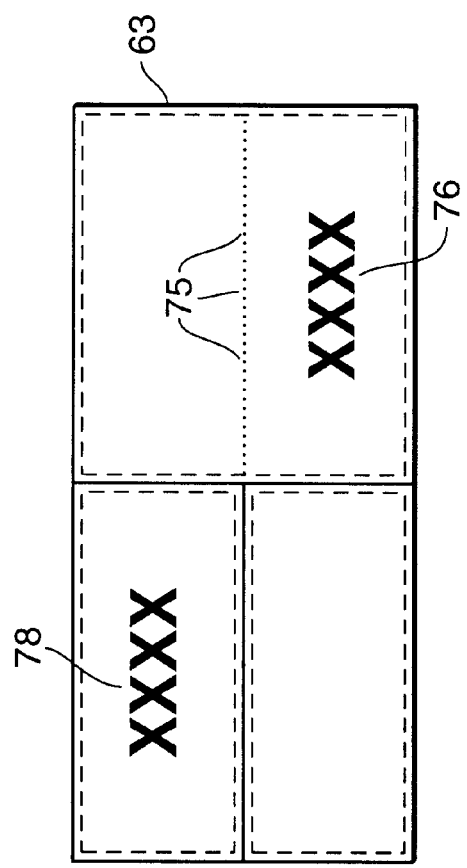
FIG. 10 is a view of an interior portion of the FIG. 8 table image.

In step S713, white areas within the large components detected in step S710 are searched. For example, FIG. 10 shows searched white areas within component 63. If, in step S714, it is determined that the searched white areas do not indicate a table-like structure, flow proceeds to step S721. If so, flow continues to step S715.

The searched white areas, shown in FIG. 10, are stored in WHITE_SET1 in step S715. Next, in step S716, connected components within component 63 are identified. Flow progresses in steps S717, S718 and S719 with respect to component 63 similarly to flow in steps S706, S707 and S709 with respect to component 50. Accordingly, components 75 are identified as forming a horizontal line which is stored in LINE_SET1 in step S717, components 76 and 78 are classified as text components in step S718, and no lines are identified based on non-text components within component 63 in step S719.

Joint lines within the large component are identified in step S720. Identified joint lines are then split into horizontal and vertical components, which are stored in LINE_SET1. In the present example, no lines are stored in LINE_SET1 during execution of step S720, since no joint line connected components are present within component 63.

Figure 11:
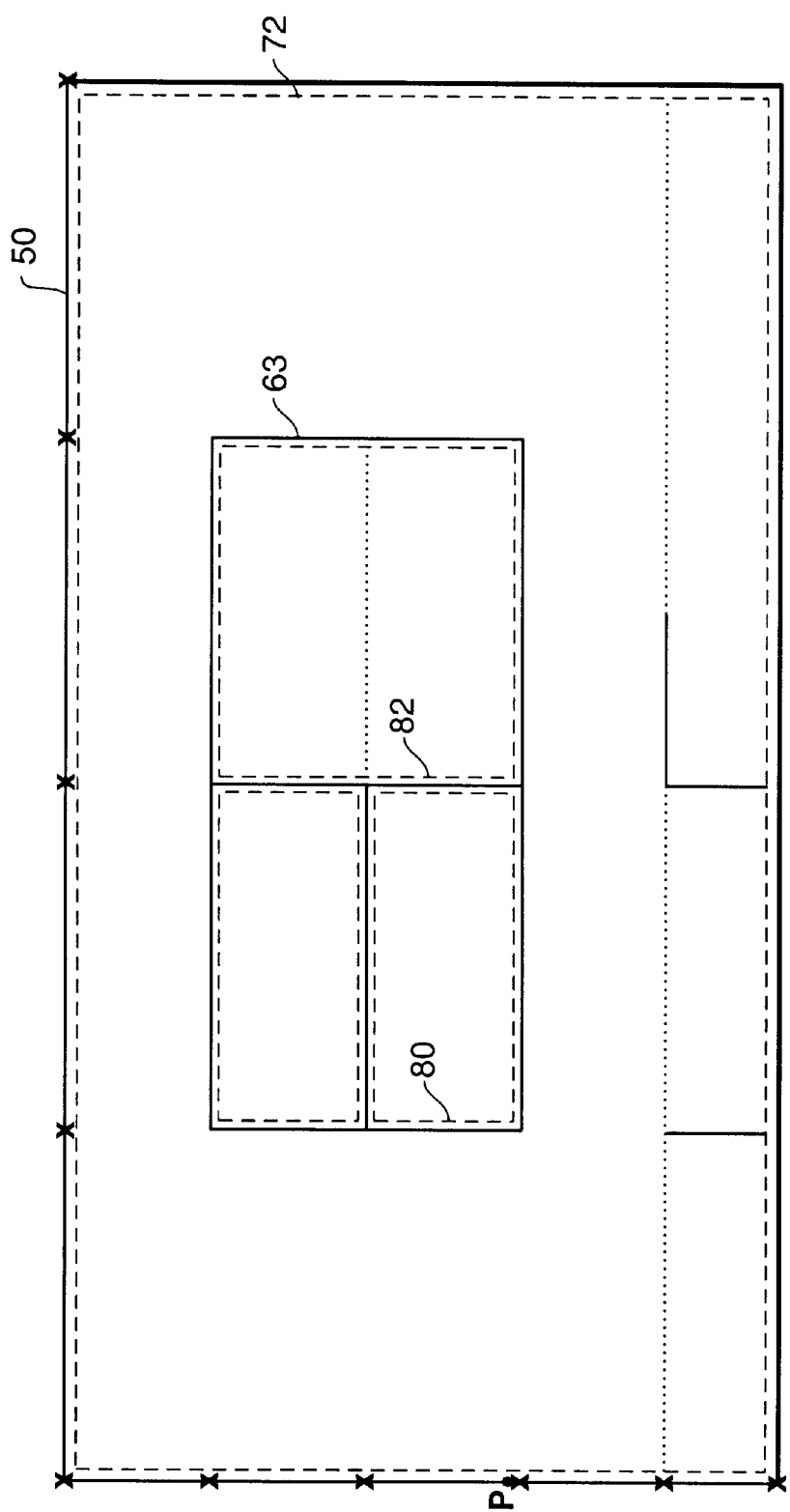
FIG. 11 is a view of lines and white areas detected within the FIG. 8 table image.

FIG. 11 illustrates the contents of WHITE_SET1 and LINE_SET1 at step S721. Based on these contents, and on connected component 50 and connected component 63, as shown, outline pairs are determined for each scan line of component 50. Outline pairs are pairs of pixel locations identifying beginning and ending points of a string of consecutive black pixels on a scan line. A preferred system for determining outline pairs is described in U.S. patent application Ser. No. 08/664,675.

Generally, outline pairs are located by traversing from left to right across a scan line. Using the scan line beginning at pixel P of FIG. 11 as an example, a first black pixel of an outline pair is encountered at the left edge of connected component 50. Black pixels are encountered as the process moves across the scan line until a white pixel of white area 72 is encountered. Since pixels of an outline pair must be black pixels and since white area 72 is encountered on its left edge, a pixel immediately to the left of the encountered white area is designated as a second pixel of the first outline pair of the scan line.

For similar reasons, locations of a next outline pair are identified at the left edge of component 63 and one pixel directly to the left of the left edge of white area 80. A first pixel of a third pair is located one pixel directly to the right of the right edge of area 80 and a corresponding second pixel is located one pixel to the left of a leftmost edge of white area 82. This process continues until the end of the scan line and is repeated for each scan line of component 50.

Using the outline pairs, consecutive black pixels of each scan line are reconstructed to determine locations of visible horizontal and vertical lines in step S722. Next, and based on the horizontal and vertical lines, row grid line and column grid line locations are determined in step S724. These locations are illustrated by "X" in FIG. 11.

In step S725, it is determined whether component 50 is a table. Specifically, component 50 is determined to be a table if a sufficient number of row grid lines and column grid lines have been identified, and if visible portions of the grid lines are of a sufficient size. If these criteria are not met, the component is not identified as a table and flow continues to step S609 of FIG. 6. If the criteria are met, the connected components identified within component 50 and component 63 are assigned to individual table cells based on the detected grid line locations. In this regard, close text components are assigned to a same cell if the area taken up by the components does not cross a visible grid line boundary. Also, in step S727, and in a case that a text component within a table cell is not surrounded by a traced white area, a white area is generated having dimensions equal to those of grid line locations surrounding the table cell. By doing so, a hierarchical tree structure can be built in which each text block of the table descends from a "white" node. Flow then continues to step S607 of FIG. 6.

Figure 12B:
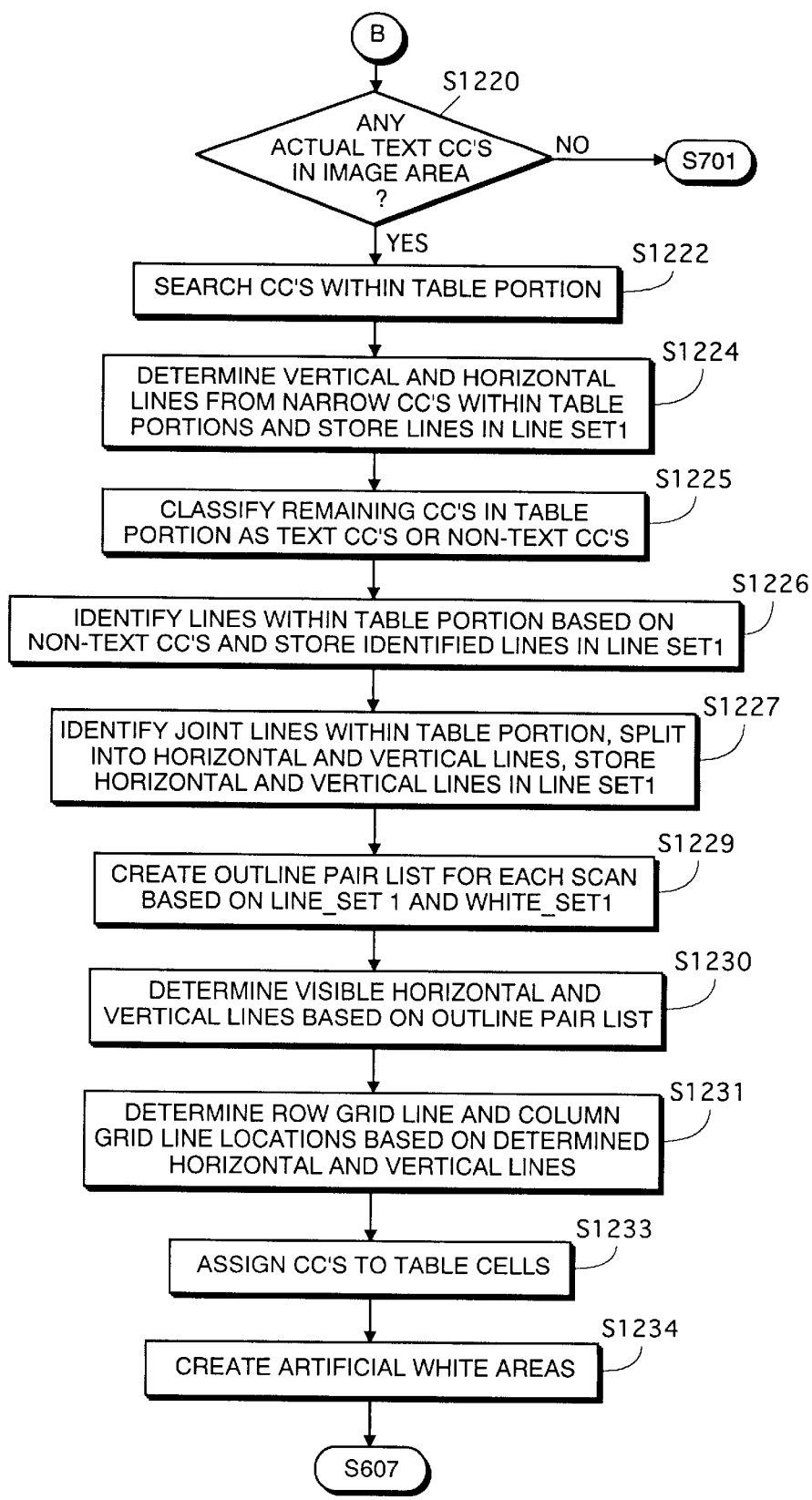

FIG. 12 is a flow diagram of process steps to analyze a selected region of a document as a table image. The process steps are preferably stored on fixed disk 3 and executed by CPU 20.

Initially, in step S1201, a user, using keyboard 5 or pointing device 6, selects an image area of a document image displayed on monitor 2. Next, connected components within the area are detected in step S1202 as described above with respect to step S302 and step S602. In step S1204, the components are classified into text and non-text components according to the process of steps S304 and S305. Also in step S1204, and as described above with respect to steps S705 and S706, vertical and horizontal dotted/dashed lines are determined from narrow connected components and any which are determined are stored in LINE_SET1. Next, in step S1205, it is determined whether only one non-text component exists in the region. If so, flow proceeds to step S1206.

If the sole non-text component is determined to be a table, internal components of the non-text component are arranged, along with internal white areas, into a tabular (row/column) format and flow proceeds to step S607. If the component is not a table, flow continues to step S1207. If, on the other hand, more than one or less than one non-text component exists in the selected image area, flow also continues to step S1207.

Steps S1207 to S1215 correspond to steps S709 to S714, and detailed descriptions thereof can be found with reference to these steps. However, rather than analyzing a frame region as in steps S709 to S714, steps S1207 to S1215 are performed on the selected image area.

If, in step S1215, white areas searched within a large connected component in the area are not indicative of a table portion, an error message is issued in step S1216 and flow terminates. If the white areas are indicative of a table portion, flow continues to step S1217, wherein the white areas of the table portion are stored in WHITE_SET1.

Next, in step S1220, it is determined whether any text connected components exist in the selected image area. If not, flow proceeds to step S701 of FIG. 7. The reason for directing flow to step S701 is that, in a case that the selected area is determined to contain a table portion and no text components, it is believed that other table portions are likely to exist within the identified table portion.

On the other hand, if it is determined in step S1220 that a text component is located in the image area along with the identified table portion, it is believed that table portions are not likely to exist in the identified table portion. Accordingly, flow continues to step S1222 to identify features within the table portion, but does not attempt to identify features of table portions within the identified table portion.

In this regard, flow proceeds from step S1222 to step S1231 in order to analyze the identified table portion as described above with respect to steps S716 to S724. Next, steps S1233 and S1234 are executed, which correspond to steps S726 and S727. Flow then continues to step S607.

While the present invention is described above with respect to what is currently considered its preferred embodiments, it is to be understood that the invention is not limited to that described above. To the contrary, the invention is intended to cover various modifications and equivalent arrangements included within the spirit and scope of the appended claims.

What is claimed is:

1. A method for identifying a table image in a document image, comprising:

identifying a frame image in the document image;

identifying white areas within the frame image;

identifying broken lines within the frame image by searching for black pixels within the frame image;

calculating horizontal and vertical grid lines based on the identified white areas and the identified broken lines; and determining whether the frame image is a table image based on the calculated horizontal and vertical grid lines, wherein some portion of the calculated horizontal and vertical grid lines of the table image is missing from the frame image.

2. A method according to claim 1, further comprising:

identifying a table portion within the frame image;

identifying broken lines within the table portion; and identifying white areas within the table portion, wherein the horizontal and vertical grid lines are identified based on the identified broken lines within the table portion and the identified white areas within the table portion.

3. A method according to claim 2, wherein the step of calculating horizontal and vertical grid lines based on the identified white areas and the identified broken lines comprises:

determining outline pairs for each line in the frame image based on the identified white areas and the identified broken lines; and identifying horizontal and vertical lines based on the determined outline pairs.

4. A method according to claim 1, wherein the step of calculating horizontal and vertical grid lines based on the identified white areas and the identified broken lines comprises:

determining outline pairs for each line in the frame image based on the identified white areas and the identified broken lines; and identifying horizontal and vertical lines based on the determined outline pairs.

5. A method according to claim 1, further comprising:

identifying text and non-text connected components within the frame image; and assigning each text connected component to a table cell defined by the horizontal and vertical grid lines.

6. A method according to claim 1, wherein the frame is determined to be a table image based on a determined number of horizontal and vertical grid lines and a determined size of visible portions of grid lines.

7. A method according to claim 6, wherein each of the visible portions of grid lines is defined by an outline pair of pixel locations identifying beginning and ending points of a string of consecutive black pixels on a scan line of the frame image.

8. In a block selection system for identifying regions of a document image, a method for processing a region as a table image, comprising:

accepting a user input indicating that a region of a document image is a table image;

identifying white areas within the region;

identifying broken lines within the region by searching for black pixels within the region; and calculating horizontal and vertical grid lines based on the identified white areas and the identified broken lines, wherein some portion of the calculated horizontal and vertical grid lines is missing from the indicated region of the document image.

9. A method according to claim 8, further comprising:

identifying a table portion within the region;

identifying broken lines within the table portion; and identifying white areas within the table portion, wherein the horizontal and vertical grid lines are identified based on the identified broken lines within the table portion and the identified white areas within the table portion.

10. A method according to claim 9, wherein the step of calculating horizontal and vertical grid lines based on the identified white areas and the identified broken lines comprises:

determining outline pairs for each line in the region based on the identified white areas and the identified broken lines; and identifying horizontal and vertical lines based on the determined outline pairs.

11. A method according to claim 8, wherein the step of calculating horizontal and vertical grid lines based on the identified white areas and the identified broken lines comprises:

determining outline pairs for each line in the region based on the identified white areas and the identified broken lines; and identifying horizontal and vertical lines based on the determined outline pairs.

12. A method according to claim 8, further comprising:

identifying text and non-text connected components within the region; and assigning each text connected component to a table cell defined by the horizontal and vertical grid lines.

13. A method according to claim 8, wherein the frame is determined to be a table image based on a determined number of horizontal and vertical grid lines and a determined size of visible portions of grid lines.

14. A method according to claim 13, wherein each of the visible portions of grid lines is defined by an outline pair of pixel locations identifying beginning and ending points of a string of consecutive black pixels on a scan line of the frame image.

15. A computer-readable memory medium storing computer-executable process steps for identifying a table image in a document image, the steps comprising:

an identifying step to identify a frame image in the document image;

an identifying step to identify white areas within the frame image;

an identifying step to identify broken lines within the frame image by searching for black pixels within the frame image;

a calculating step to calculate horizontal and vertical grid lines based on the identified white areas and the identified broken lines; and a determining step to determine whether the frame image is a table image based on the calculated horizontal and vertical grid lines, wherein some portion of the calculated horizontal and vertical grid lines of the table image is missing from the frame image.

16. A computer-readable memory medium storing computer-executable process steps according to claim 15, further comprising:

an identifying step to identify a table portion within the frame image;

an identifying step to identify broken lines within the table portion; and an identifying step to identify white areas within the table portion, wherein the horizontal and vertical grid lines are identified based on the identified broken lines within the table portion and the identified white areas within the table portion.

17. A computer-readable memory medium storing computer-executable process steps according to claim 16, wherein the step of calculating horizontal and vertical grid lines based on the identified white areas and the identified broken lines comprises:

a determining step to determine outline pairs for each line in the frame image based on the identified white areas and the identified broken lines; and an identifying step to identify horizontal and vertical lines based on the determined outline pairs.

18. A computer-readable memory medium storing computer-executable process steps according to claim 15, wherein the step of calculating horizontal and vertical grid lines based on the identified white areas and the identified broken lines comprises:

a determining step to determine outline pairs for each line in the frame image based on the identified white areas and the identified broken lines; and an identifying step to identify horizontal and vertical lines based on the determined outline pairs.

19. A computer-readable memory medium storing computer-executable process steps according to claim 15, further comprising:

an identifying step to identify text and non-text connected components within the frame image; and an assigning step to assign each text connected component to a table cell defined by the horizontal and vertical grid lines.

20. A computer-readable memory medium storing computer-executable process steps according to claim 15, wherein the frame is determined to be a table image based on a determined number of horizontal and vertical grid lines and a determined size of visible portions of grid lines.

21. A computer-readable memory medium storing computer-executable process steps according to claim 20, wherein each of the visible portions of grid lines is defined by an outline pair of pixel locations identifying beginning and ending points of a string of consecutive black pixels on a scan line of the frame image.

22. In a block selection system for identifying regions of a document image, a computer-readable memory medium storing computer-executable process steps for processing a region as a table image, the steps comprising:

an accepting step to accept a user input indicating that a region of a document image is a table image;

an identifying step to identify white areas within the region;

an identifying step to identify broken lines within the region by searching for black pixels within the region; and a calculating step to calculate horizontal and vertical grid lines based on the identified white areas and the identified broken lines, wherein some portion of the calculated horizontal and vertical grid lines is missing from the indicated region of the document image.

23. A computer-readable memory medium storing computer-executable process steps according to claim 22, further comprising:

an identifying step to identify a table portion within the region;

an identifying step to identify broken lines within the table portion; and an identifying step to identify white areas within the table portion, wherein the horizontal and vertical grid lines are identified based on the identified broken lines within the table portion and the identified white areas within the table portion.

24. A computer-readable memory medium storing computer-executable process steps according to claim 23, wherein the step of calculating horizontal and vertical grid lines based on the identified white areas and the identified broken lines comprises:

a determining step to determine outline pairs for each line in the region based on the identified white areas and the identified broken lines; and an identifying step to identify horizontal and vertical lines based on the determined outline pairs.

25. A computer-readable memory medium storing computer-executable process steps according to claim 23, wherein the frame is determined to be a table image based on a determined number of horizontal and vertical grid lines and a determined size of visible portions of grid lines.

26. A computer-readable memory medium storing computer-executable process steps according to claim 25, wherein each of the visible portions of grid lines is defined by an outline pair of pixel locations identifying beginning and ending points of a string of consecutive black pixels on a scan line of the frame image.

27. A computer-readable memory medium storing computer-executable process steps according to claim 22, wherein the step of calculating horizontal and vertical grid lines based on the identified white areas and the identified broken lines comprises:

a determining step to determine outline pairs for each line in the region based on the identified white areas and the identified broken lines; and an identifying step to identify horizontal and vertical lines based on the determined outline pairs.

28. A computer-readable memory medium storing computer-executable process steps according to claim 22, further comprising:

an identifying step to identify text and non-text connected components within the region; and an assigning step to assign each text connected component to a table cell defined by the horizontal and vertical grid lines.

29. An apparatus for identifying a table image in a document image comprising:

a memory for storing computer executable process steps; and a processor for executing the process steps stored in said memory to 1) identify a frame image in the document image, 2) identify white areas within the frame image, 3) identify broken lines within the frame image by searching for black pixels within the frame image, 4) calculate horizontal and vertical grid lines based on the identified white areas and the identified broken lines, and 5) determine whether the frame image is a table image based on the calculated horizontal and vertical grid lines, wherein some portion of the calculated horizontal and vertical grid lines of the table image is missing from the frame image.

30. An apparatus according to claim 29, wherein the processor executes the process steps stored in the memory to 1) identify a table portion within the frame image, 2) identify broken lines within the table portion, and 3) identify white areas within the table portion, wherein the horizontal and vertical grid lines are identified based on the identified broken lines within the table portion and the identified white areas within the table portion.

31. An apparatus according to claim 30, wherein the step of calculating horizontal and vertical grid lines based on the identified white areas and the identified broken lines comprises steps to determine outline pairs for each line in the frame image based on the identified white areas and the identified broken lines, and to identify horizontal and vertical lines based on the determined outline pairs.

32. An apparatus according to claim 29, wherein the step of calculating horizontal and vertical grid lines based on the identified white areas and the identified broken lines comprises steps to determine outline pairs for each line in the frame image based on the identified white areas and the identified broken lines, and to identify horizontal and vertical lines based on the determined outline pairs.

33. An apparatus according to claim 29, wherein the processor executes the process steps stored in the memory to 1) identify text and non-text connected components within the frame image, and 2) assign each text connected component to a table cell defined by the horizontal and vertical grid lines.

34. An apparatus according to claim 29, wherein the frame is determined to be a table image based on a determined number of horizontal and vertical grid lines and a determined size of visible portions of grid lines.

35. An apparatus according to claim 34, wherein each of the visible portions of grid lines is defined by an outline pair of pixel locations identifying beginning and ending points of a string of consecutive black pixels on a scan line of the frame image.

36. In a block selection system for identifying regions of a document image, an apparatus for processing a region as a table image comprising:

a memory for storing computer executable process steps; and a processor for executing the process steps stored in said memory to 1) accept a user input indicating that a region of a document image is a table image, 2) identify white areas within the region, 3) identify broken lines within the region by searching for black pixels within the region, and 4) calculate horizontal and vertical grid lines based on the identified white areas and the identified broken lines, wherein some portion of the calculated horizontal and vertical grid lines of the table image is missing from the indicated region of the document image.

37. An apparatus according to claim 36, wherein the processor executes the process steps stored in the memory to 1) identify a table portion within the region, 2) identify broken lines within the table portion, and 3) identify white areas within the table portion, wherein the horizontal and vertical grid lines are identified based on the identified broken lines within the table portion and the identified white areas within the table portion.

38. An apparatus according to claim 37, wherein the step of calculating horizontal and vertical grid lines based on the identified white areas and the identified broken lines comprises steps to determine outline pairs for each line in the region based on the identified white areas and the identified broken lines, and to identify horizontal and vertical lines based on the determined outline pairs.

39. An apparatus according to claim 36, wherein the step of calculating horizontal and vertical grid lines based on the identified white areas and the identified broken lines comprises steps to determine outline pairs for each line in the region based on the identified white areas and the identified broken lines, and to identify horizontal and vertical lines based on the determined outline pairs.

40. An apparatus according to claim 36, wherein the processor executes the process steps stored in the memory to 1) identify text and non-text connected components within the region, and 2) assign each text connected component to a table cell defined by the horizontal and vertical grid lines.

41. An apparatus according to claim 36, wherein the frame is determined to be a table image based on a determined number of horizontal and vertical grid lines and a determined size of visible portions of grid lines.

42. An apparatus according to claim 41, wherein each of the visible portions of grid lines is defined by an outline pair of pixel locations identifying beginning and ending points of a string of consecutive black pixels on a scan line of the frame image.

* * * * *